(12) United States Patent
Carminati et al.

(10) Patent No.: US 10,253,831 B2
(45) Date of Patent: Apr. 9, 2019

(54) BRAKE DISC AND THE MANUFACTURING METHOD THEREOF

(71) Applicants:Freni Brembo S.p.A., Curno, Bergamo (IT); Fuji Corporation, Shuchigun Morimachi, Shizuoka-ken (JP)

(72) Inventors: Fabiano Carminati, Curno (IT); Mitsuhiro Yokota, Shuchigun Morimachi (JP)

(73) Assignees: Freni Brembo S.p.A., Curno (IT); Fuji Corporation, Shuchigun, Morimachi, Shizuoka-ken (JP)

( * ) Notice: Subject to any disclaimer, the term of this patent is extended or adjusted under 35 U.S.C. 154(b) by 0 days.

(21) Appl. No.: 15/326,993

(22) PCT Filed: Jul. 17, 2014

(86) PCT No.: PCT/EP2014/065455
§ 371 (c)(1),
(2) Date: Jan. 17, 2017

(87) PCT Pub. No.: WO2016/008535
PCT Pub. Date: Jan. 21, 2016

(65) Prior Publication Data
US 2017/0211644 A1    Jul. 27, 2017

(51) Int. Cl.
*F16D 65/12* (2006.01)
*F16D 65/02* (2006.01)

(52) U.S. Cl.
CPC ......... *F16D 65/123* (2013.01); *F16D 65/125* (2013.01); *F16D 2065/1316* (2013.01);
(Continued)

(58) Field of Classification Search
CPC ................ F16D 65/123; F16D 65/125; F16D 2065/1316; F16D 2065/1344;
(Continued)

(56) References Cited

U.S. PATENT DOCUMENTS 3,661,235 A * 5/1972 Harrison ............... F16D 65/123
188/218 XL
6,135,247 A * 10/2000 Bodin ..................... F16D 65/12
188/18 A
(Continued)

FOREIGN PATENT DOCUMENTS

DE              44 19 757 A1    12/1995
DE      10 2008 021 625 A1     11/2008
(Continued)

*Primary Examiner* — Thomas J Williams
*Assistant Examiner* — Mariano Sy
(74) *Attorney, Agent, or Firm* — Blank Rome LLP

(57) ABSTRACT

A manufacturing method of a brake disc, comprising the steps of: processing a rotor S1 to acquire the rotor made of the approximately annular plate material with a center hole, the opening edge of said center hole having a plurality of projections projecting inwardly; processing a bracket S2 to acquire a bracket made of a tubular member, in which openings corresponding to the projections are formed; and integrating the bracket S4 with the rotor by inserting the bracket through the center hole of the rotor acquired by the rotor processing step and fitting the projections of the rotor into the openings of the bracket, along with a disc brake acquired according to the manufacturing method of the brake disc.

4 Claims, 19 Drawing Sheets

(52) U.S. Cl.
CPC ............... *F16D 2065/1344* (2013.01); *F16D 2065/1356* (2013.01); *F16D 2065/1376* (2013.01); *F16D 2200/003* (2013.01); *F16D 2200/0021* (2013.01); *F16D 2250/0023* (2013.01); *F16D 2250/0061* (2013.01)

(58) Field of Classification Search
CPC ..... F16D 2065/1356; F16D 2200/0021; F16D 2200/003; F16D 2250/0023; F16D 2065/1376; F16D 2250/0061
USPC ......... 188/218 XL, 18 A, 18 R, 71.6, 264 A, 188/264 AA
See application file for complete search history.

(56) References Cited

U.S. PATENT DOCUMENTS

| | | | | |
|---|---|---|---|---|
| 6,450,303 | B1* | 9/2002 | Keck | F16D 65/123 188/218 A |
| 9,309,939 | B2* | 4/2016 | Hentrich | F16D 65/123 |
| 9,441,688 | B2* | 9/2016 | Isenmann | F16D 65/123 |
| 2007/0284200 | A1* | 12/2007 | Hampton | F16D 65/123 188/218 XL |
| 2012/0085603 | A1* | 4/2012 | Mayer | F16D 65/123 188/218 XL |
| 2013/0037359 | A1* | 2/2013 | Kim | F16D 65/12 188/218 XL |
| 2013/0112515 | A1* | 5/2013 | Shinagawa | F16D 65/12 188/218 XL |
| 2014/0224602 | A1* | 8/2014 | Saame | F16D 65/12 188/218 XL |

FOREIGN PATENT DOCUMENTS

| | | |
|---|---|---|
| EP | 0 077 137 A1 | 4/1983 |
| WO | WO 96/41967 A1 | 12/1996 |
| WO | WO 03/069179 A1 | 8/2003 |

* cited by examiner

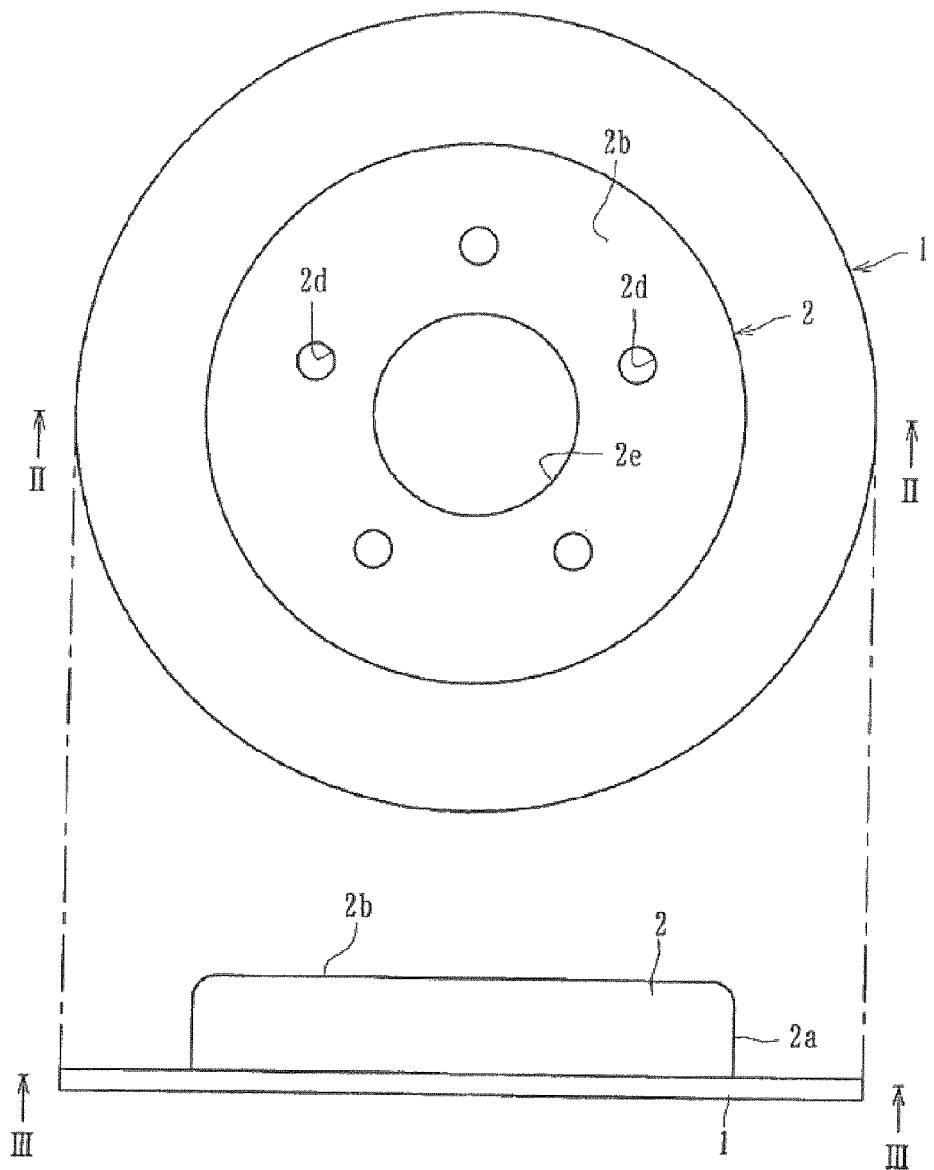
[Fig. 1]

[Fig. 2]
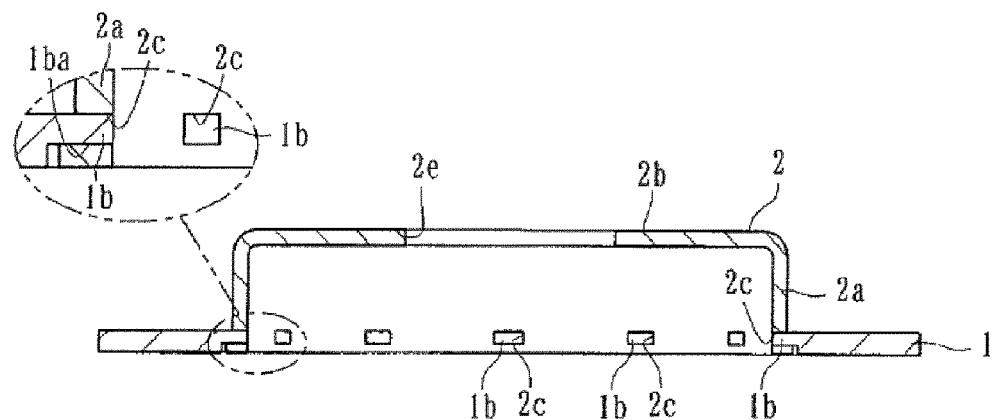
[Fig. 3]
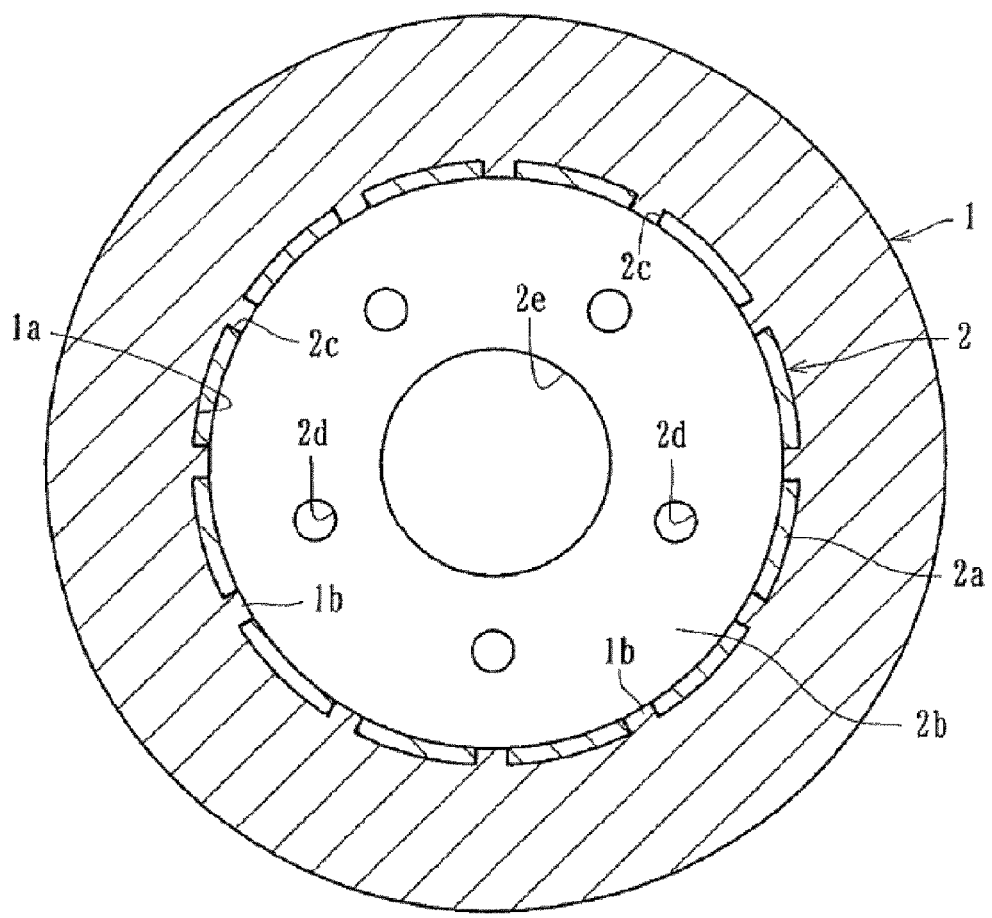

[Fig. 4]
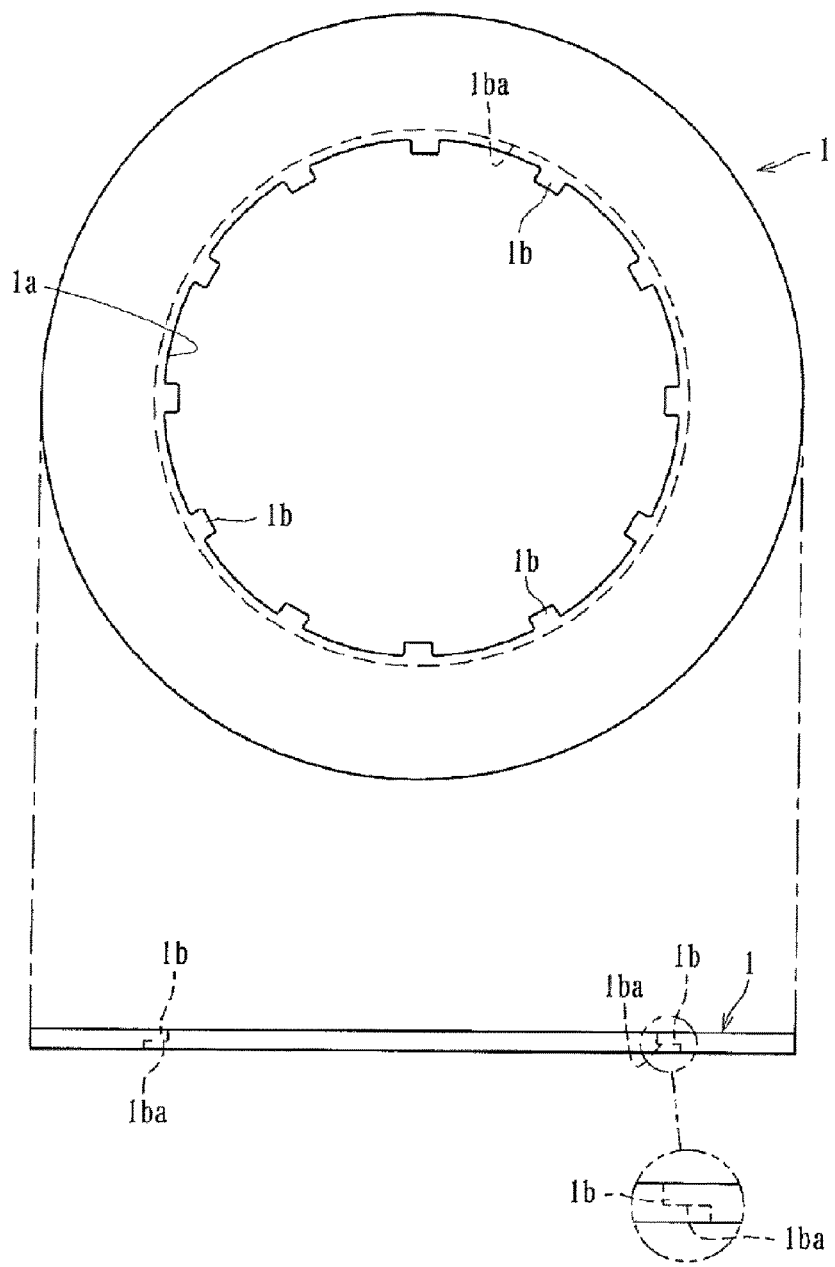

[Fig. 5]
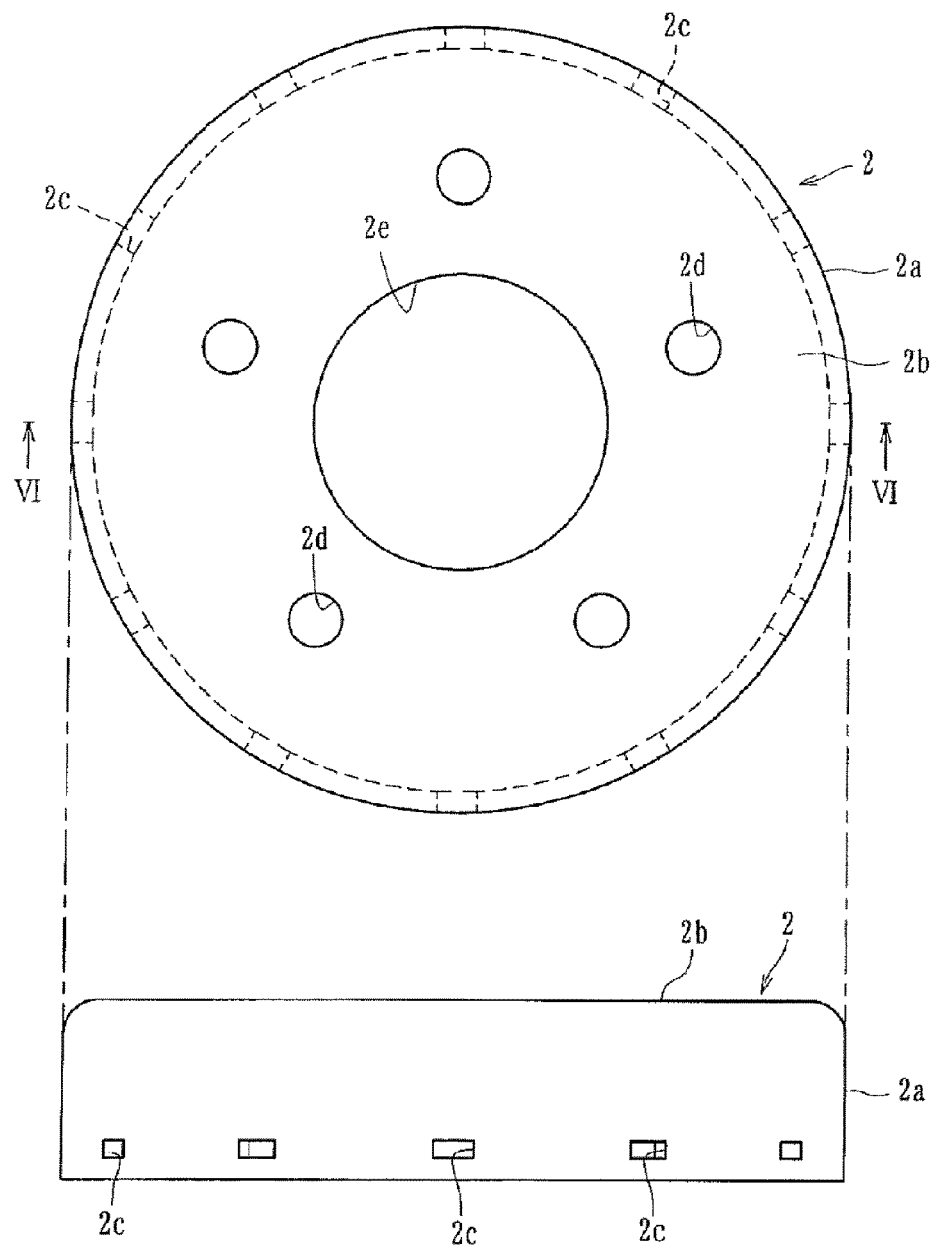

[Fig. 6]
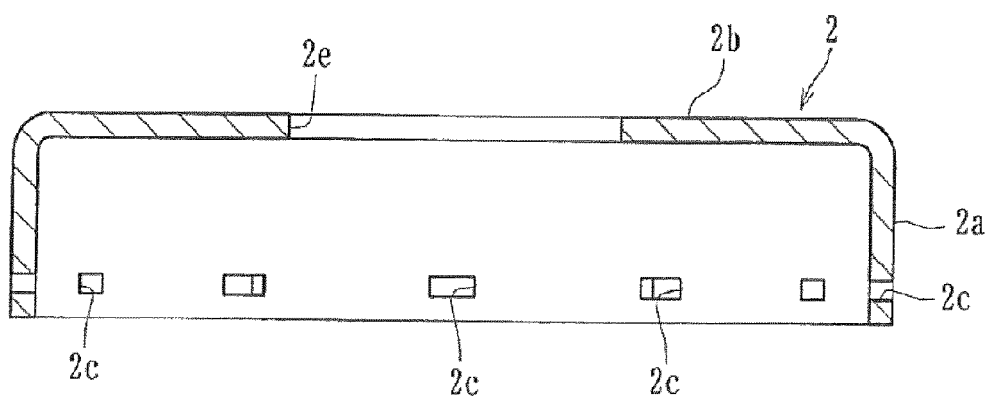

[Fig. 7]
(a)
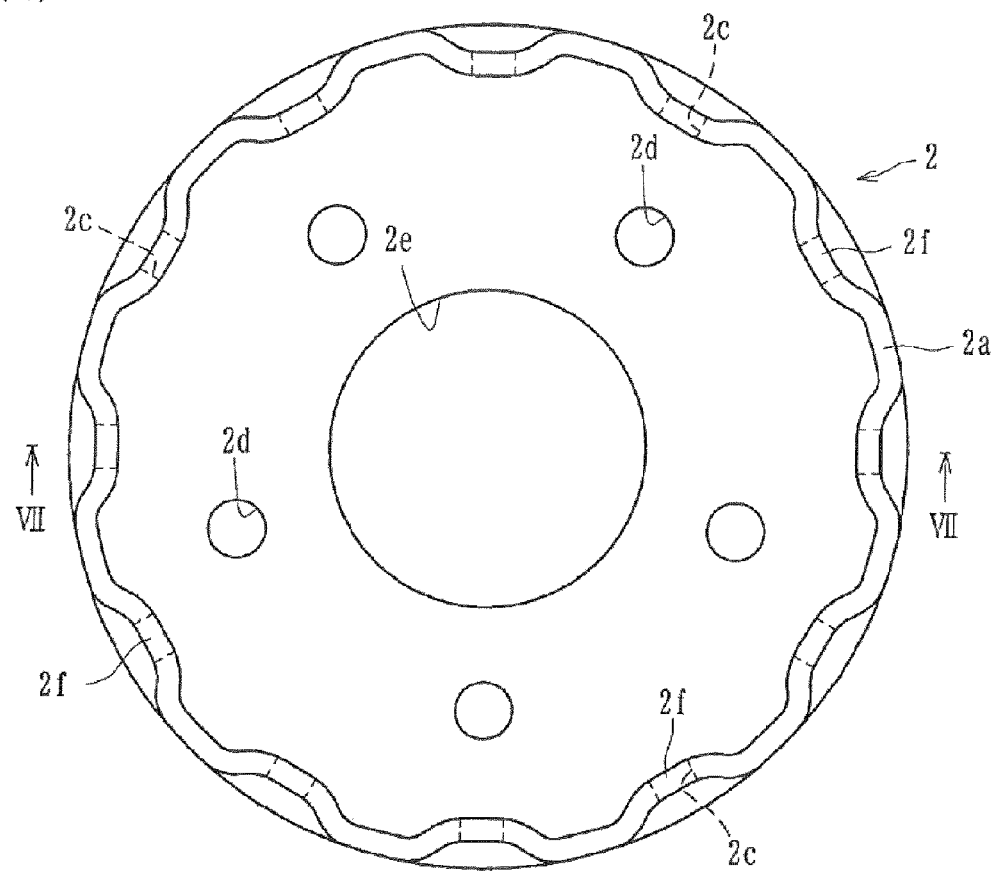
(b)
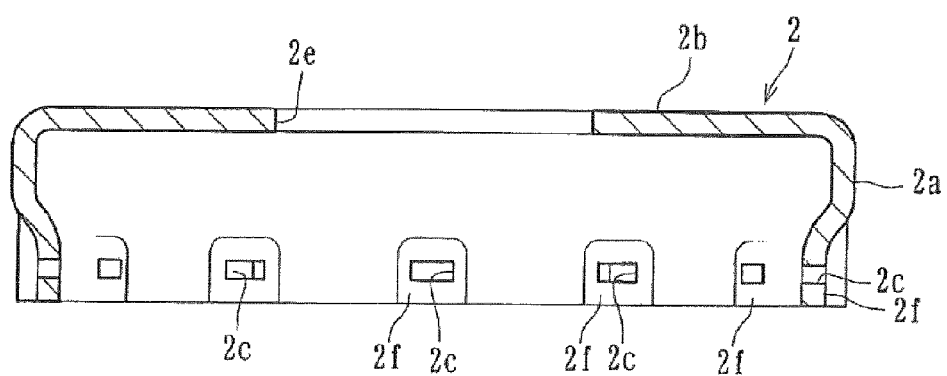

[Fig. 8]
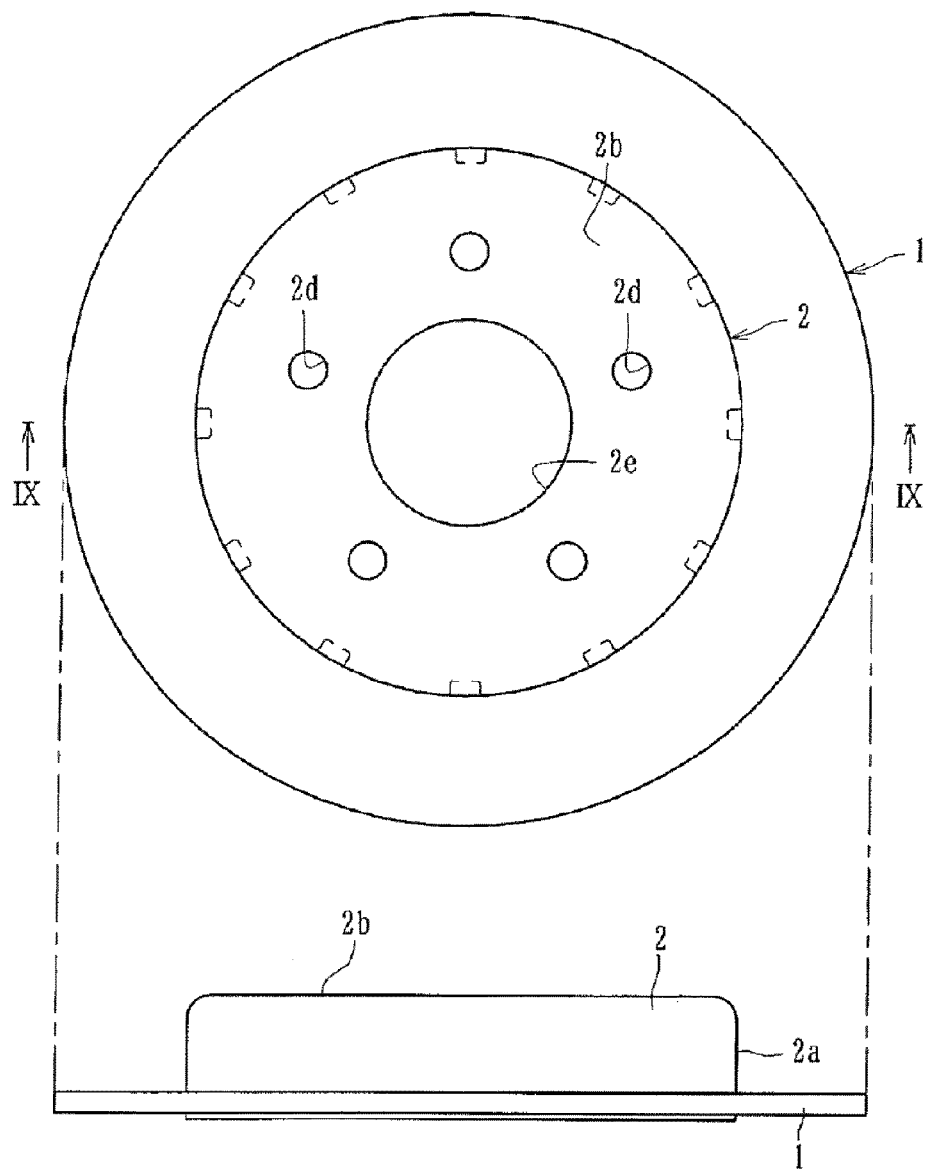

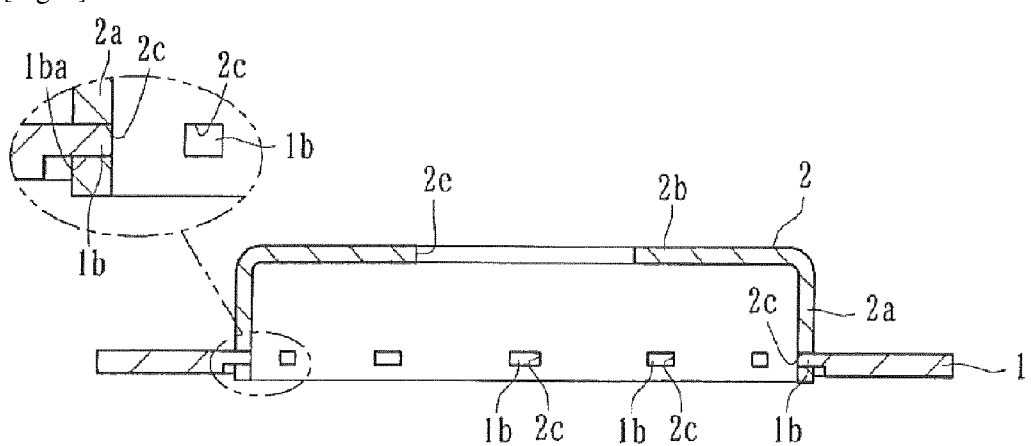
[Fig. 9]

[Fig. 10]
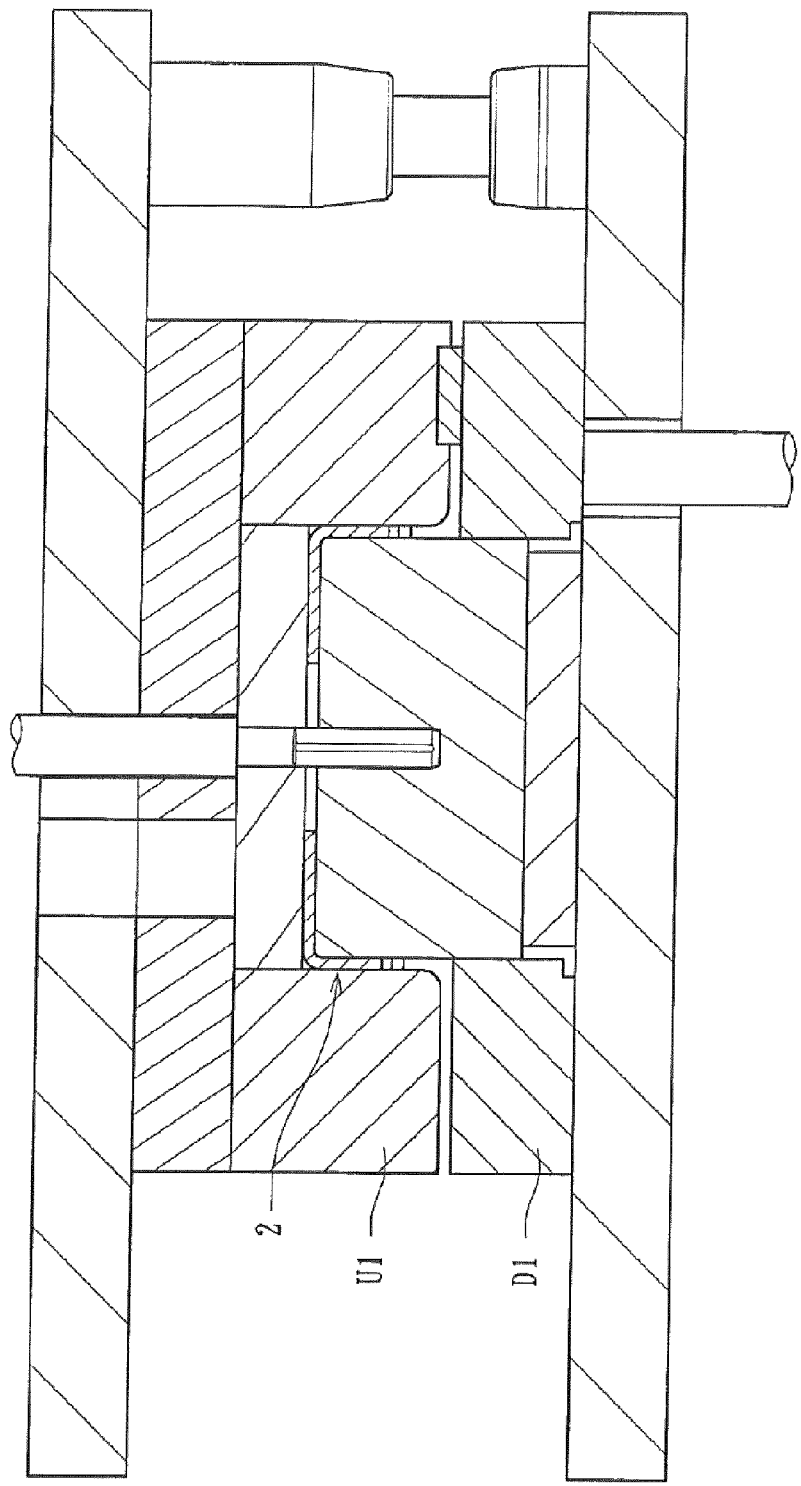

[Fig. 11]
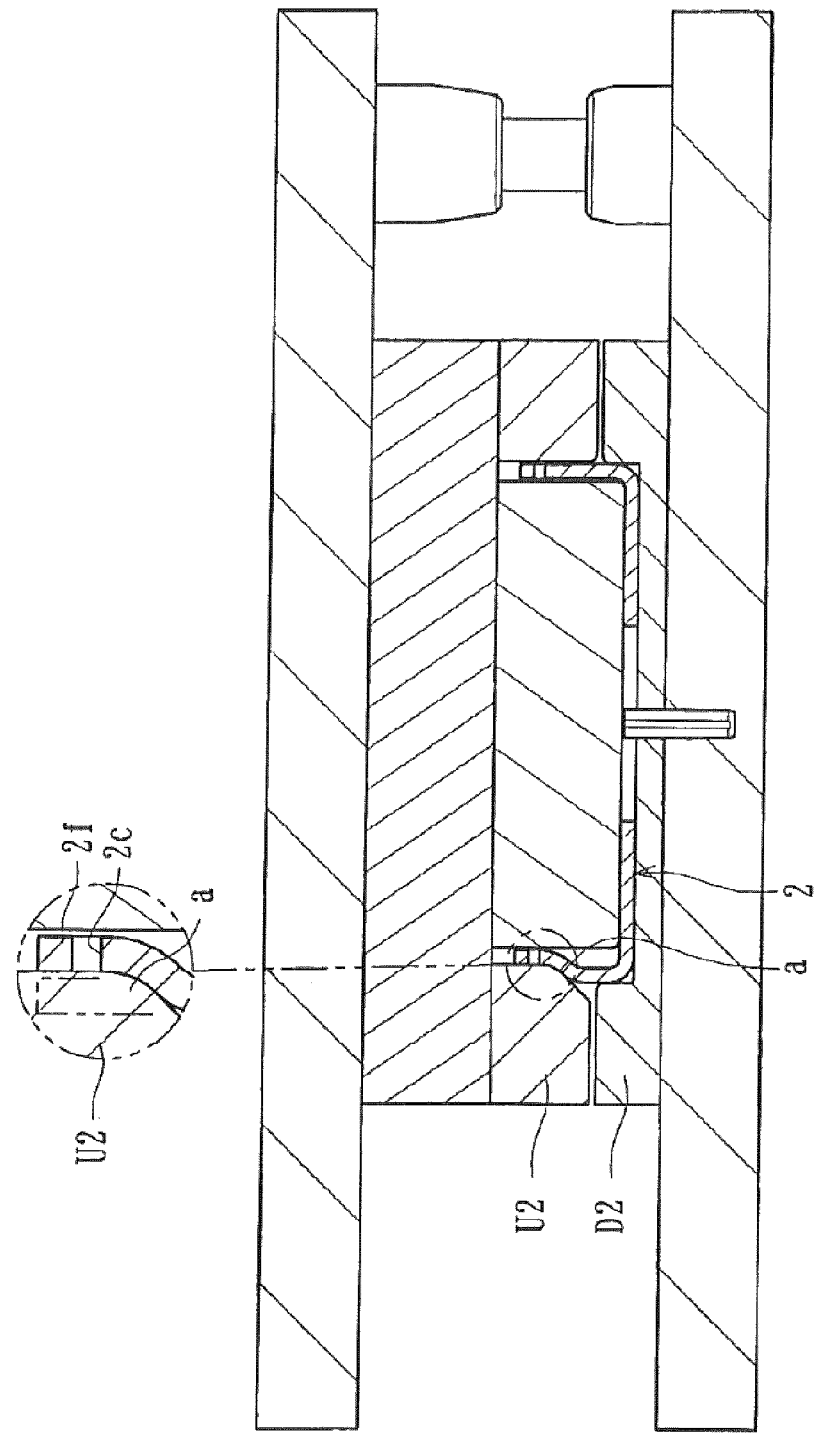

[Fig. 12]
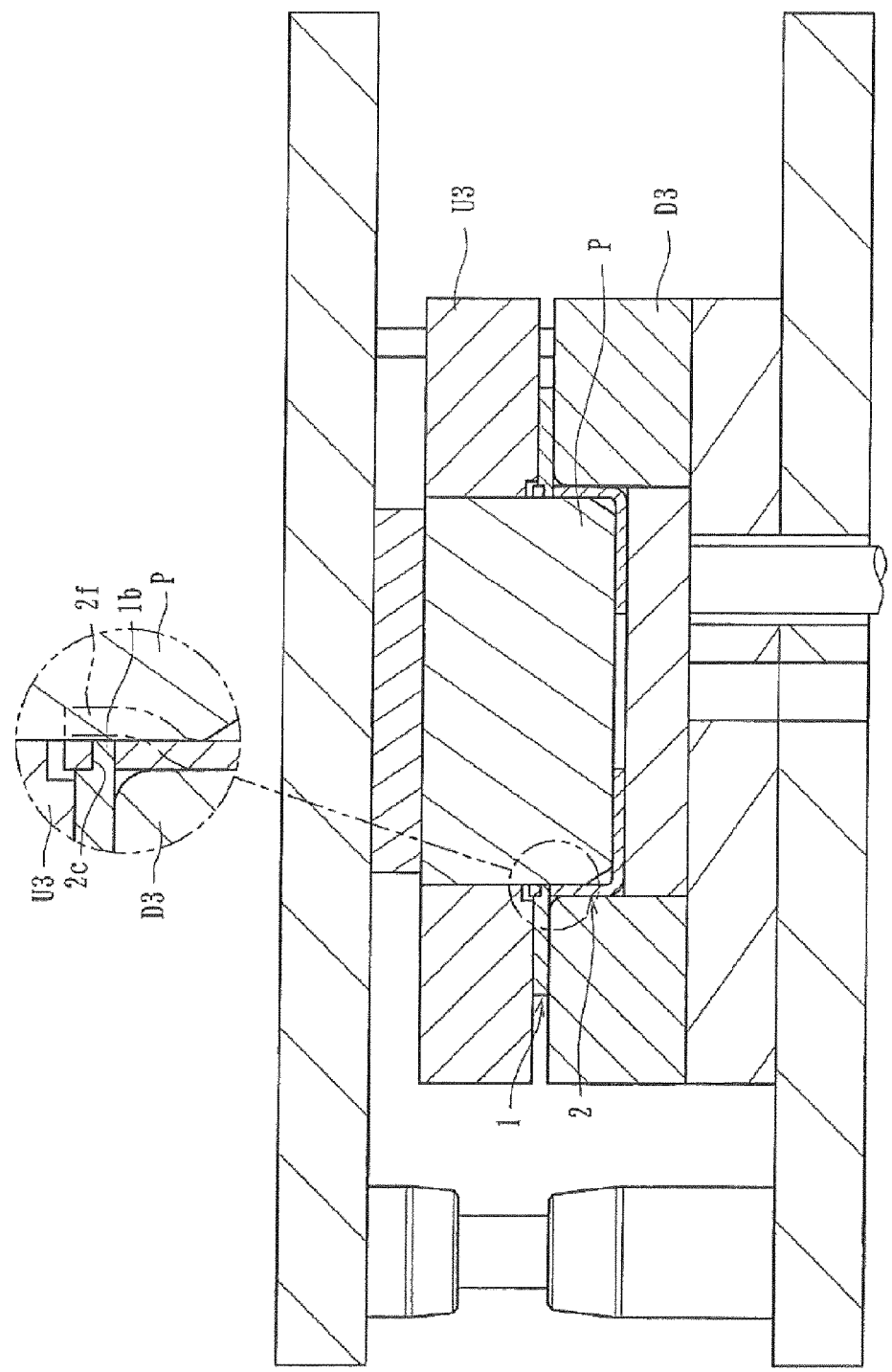

[Fig. 13]
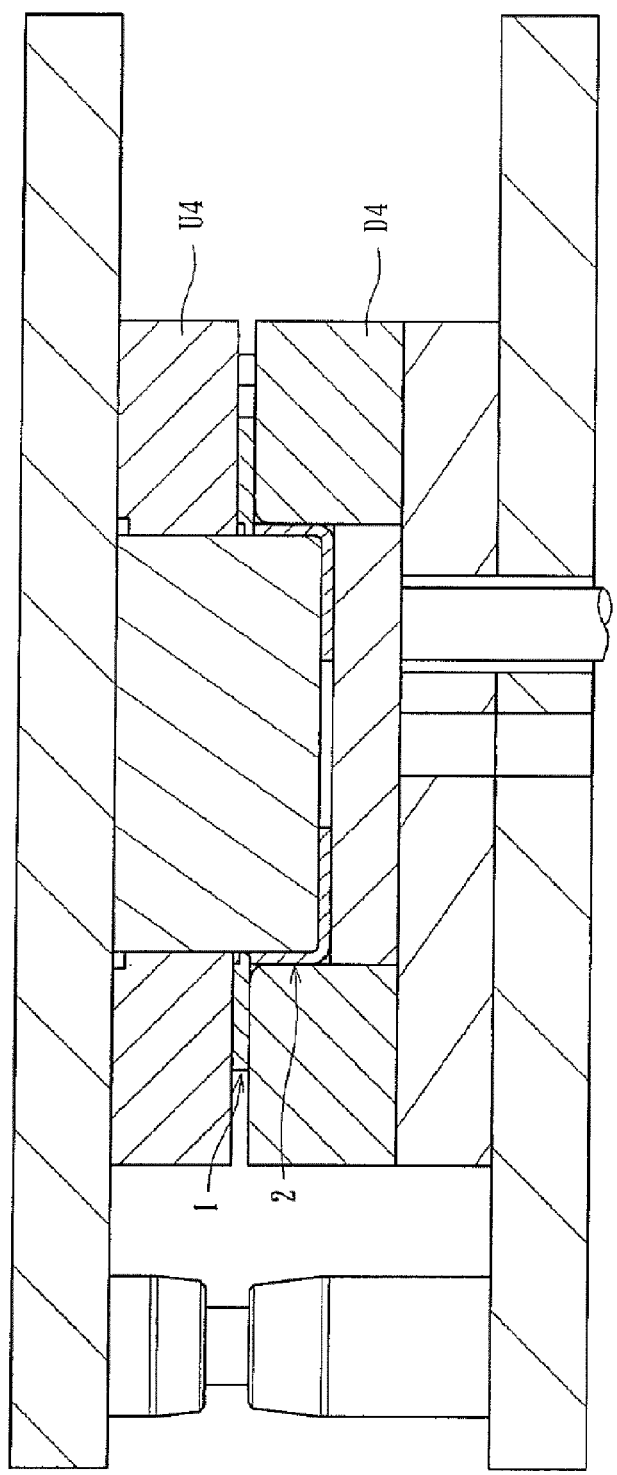

[Fig. 14]
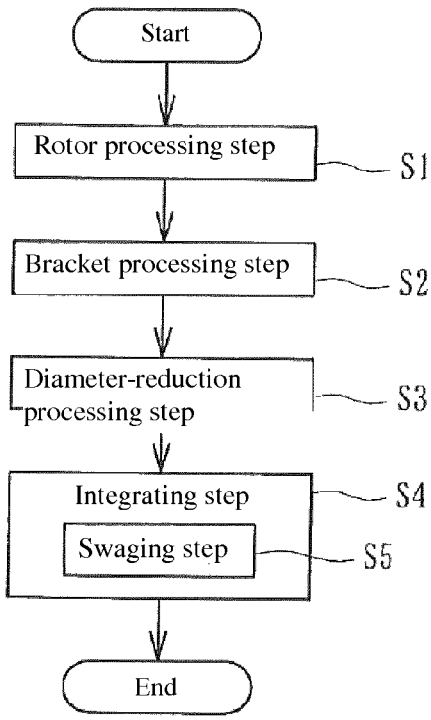
[Fig. 15]
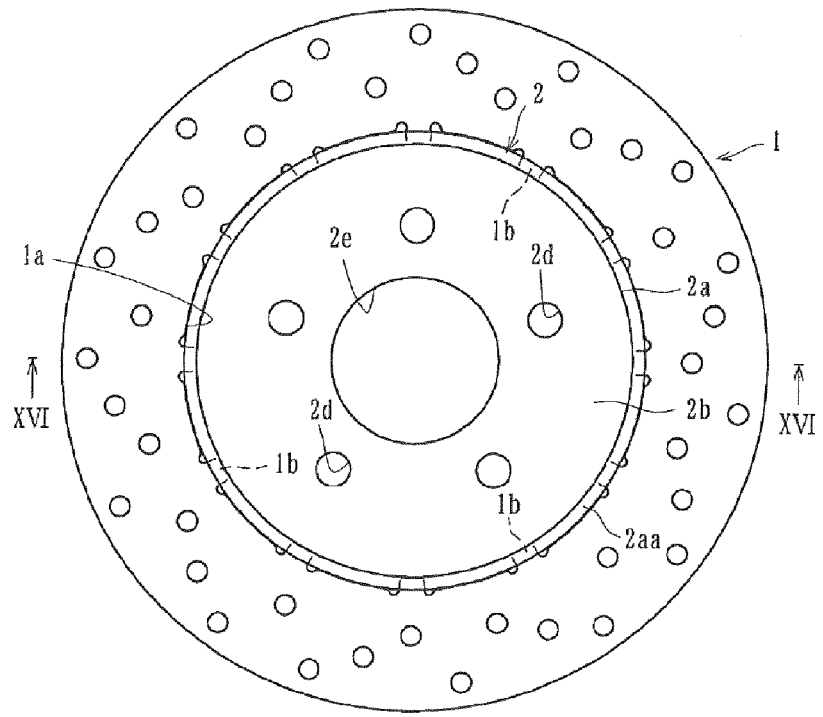

[Fig. 16]
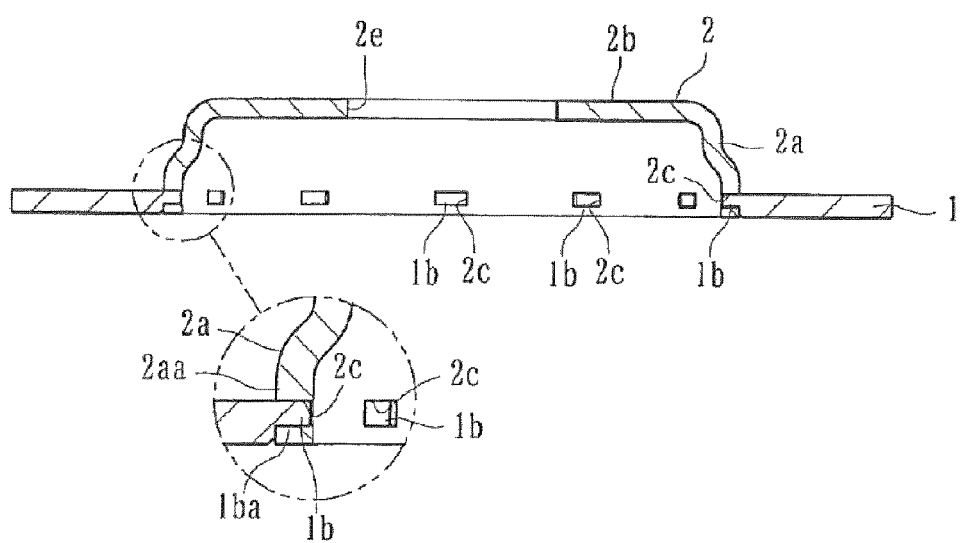

[Fig. 17]
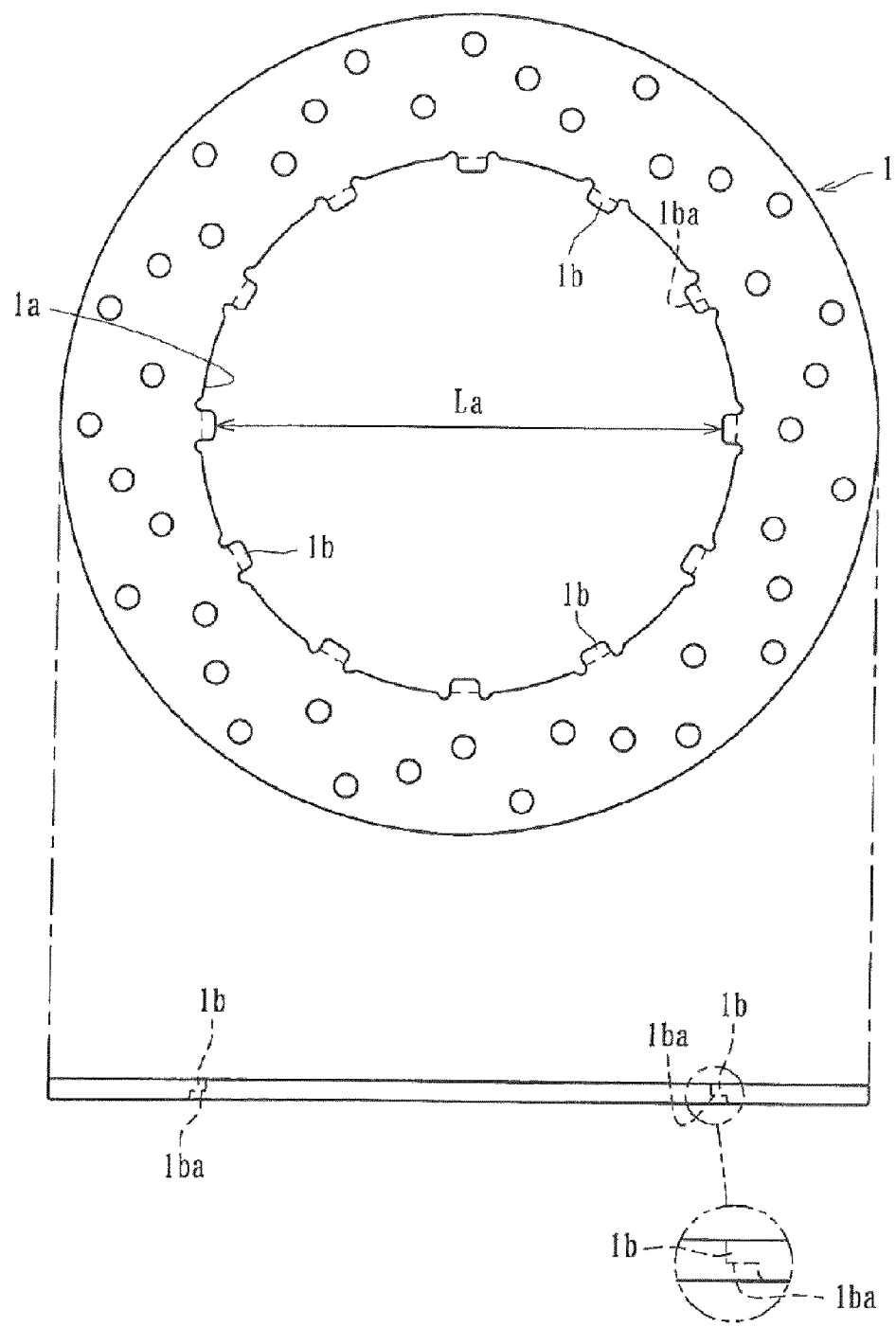

[Fig. 18]
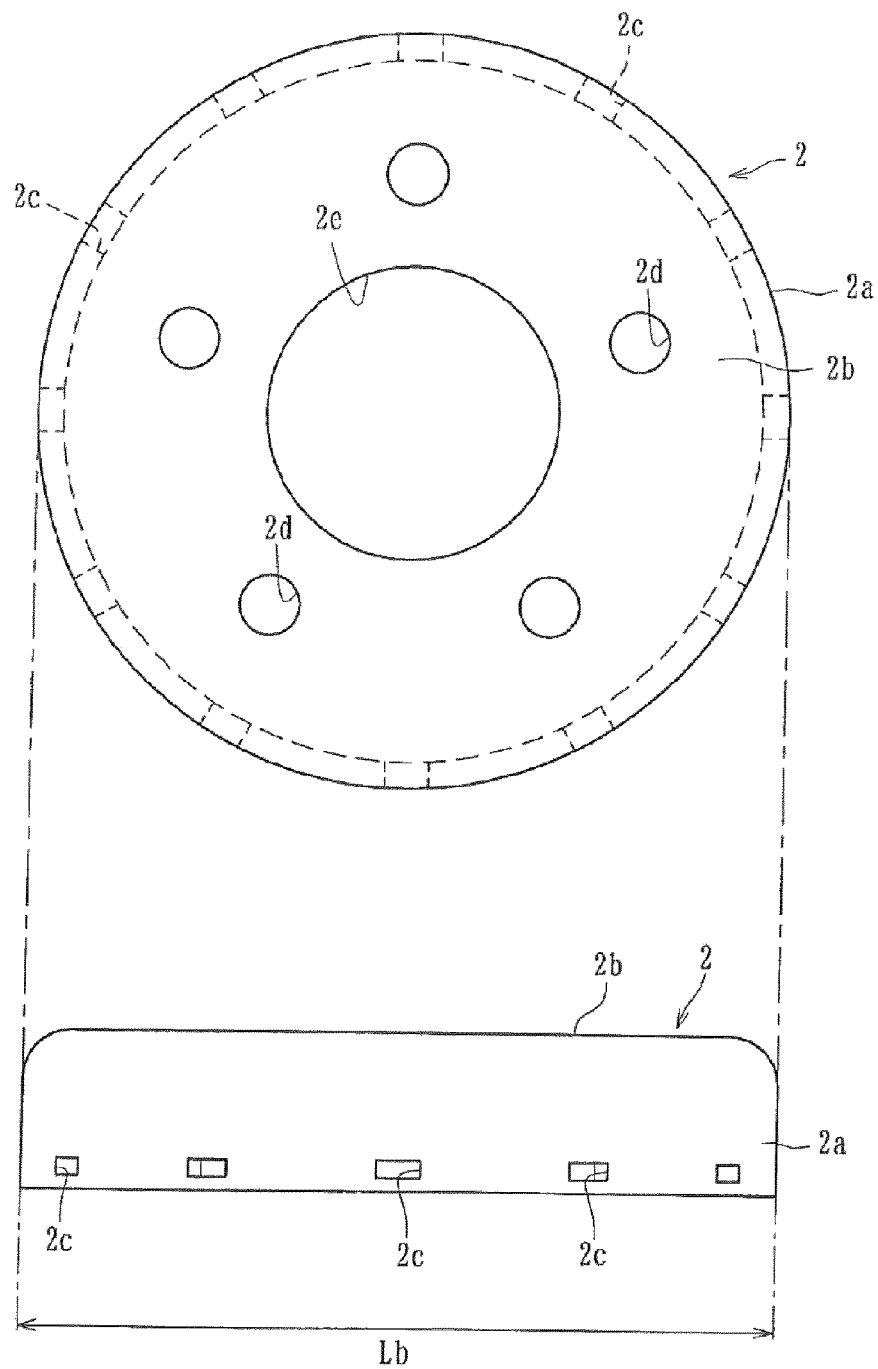

[Fig. 19]
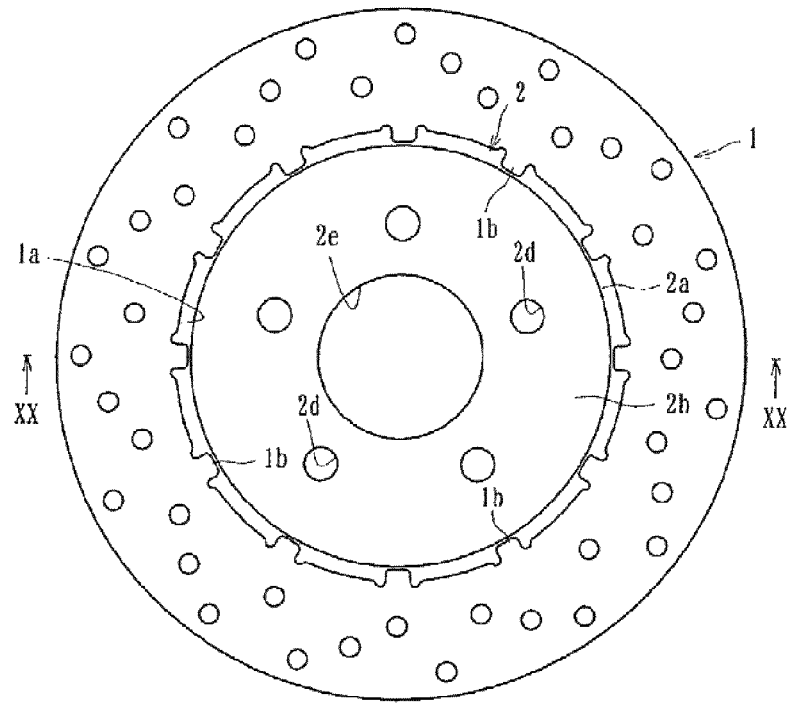
[Fig. 20]
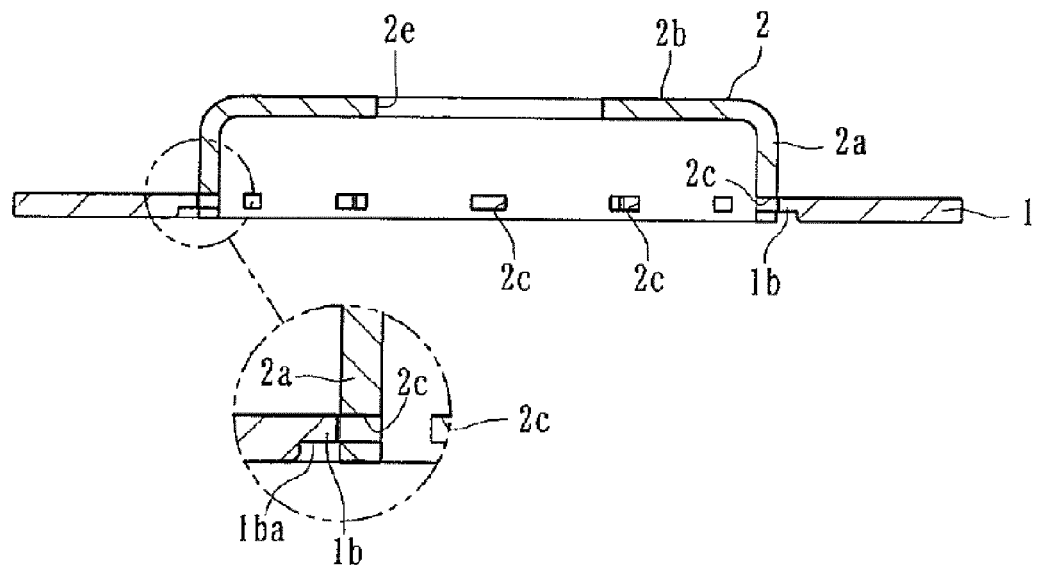

[Fig. 21]
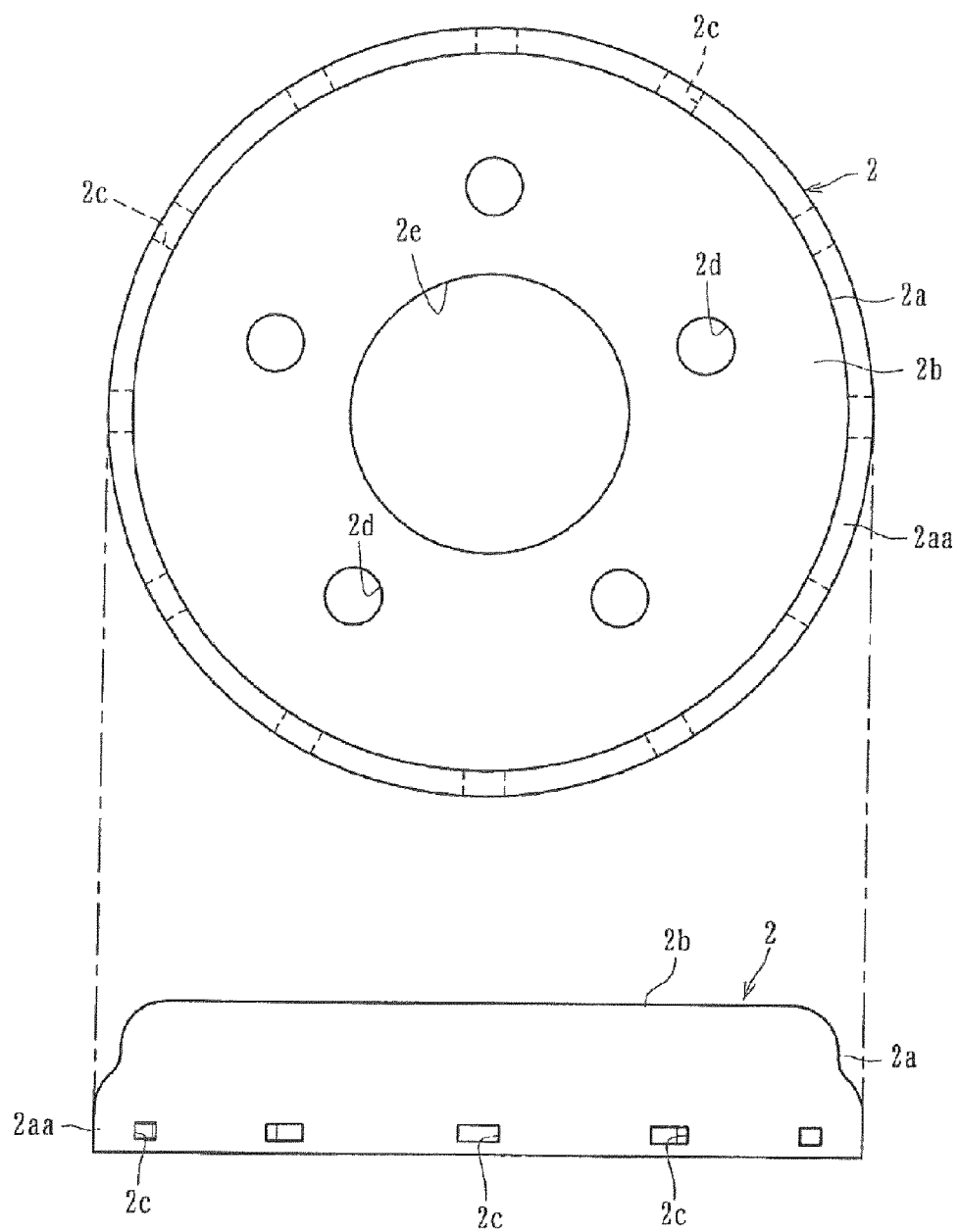

[Fig. 22]
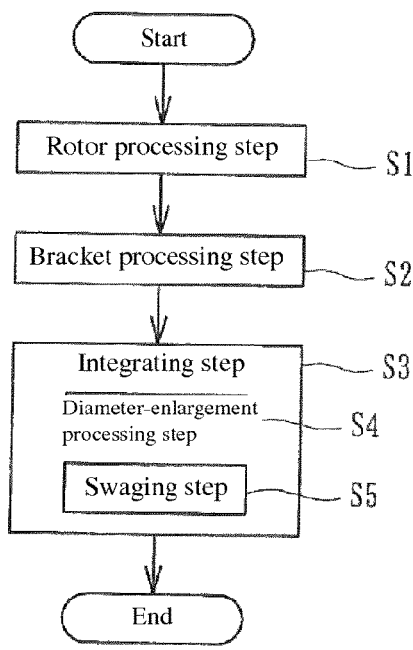
[Fig. 23]
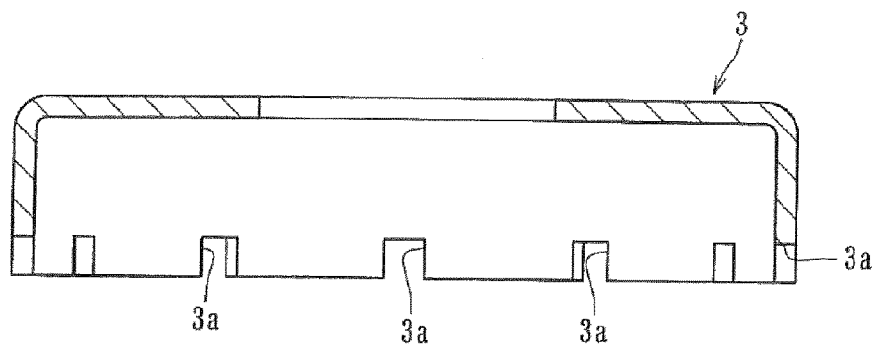
[Fig. 24]
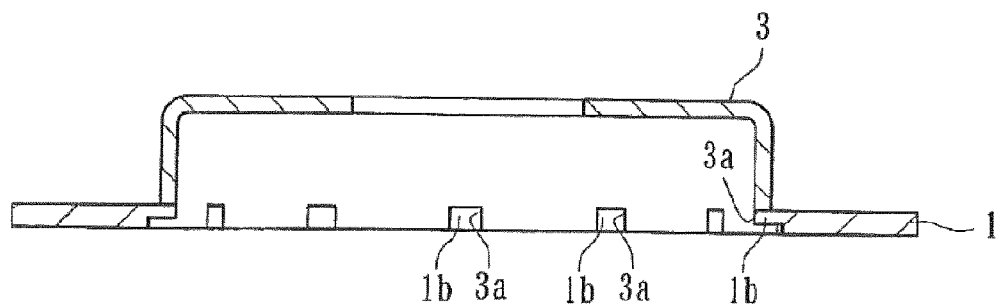

BRAKE DISC AND THE MANUFACTURING METHOD THEREOF

FIELD OF THE INVENTION

The present invention relates to a brake disc attached to the axle of a vehicle for braking the vehicle along with the manufacturing method thereof.

BACKGROUND OF THE INVENTION

A disc brake system provided with a brake disc and a brake pad has been widely used as the brake system attached to vehicles such as cars and motorcycles, enabling the braking of said vehicles. Such a disc brake system is configured so as to make it integrally rotatable with the vehicle by attaching the brake disc to the wheel of the vehicle such that it acquires the braking force by depressing the brake pad onto the brake disc.

Conventional brake discs, for example, include a brake disc having a rotor made of an approximately annular plate material and a tubular bracket attached at the center of the rotor, configured to acquire the braking force by attaching this bracket to the axle of the vehicle and depressing the brake pad onto the rotor. Such a conventional brake disc integrates the rotor with the bracket by fastening them via a fastening means such as a rivet. Furthermore, no prior art documentation is provided here as such prior art does not relate to the invention known to the public through publication.

SUMMARY OF THE INVENTION

Problem to be Solved by the Invention

The abovementioned conventional brake disc has a technical advantage in that the optimum materials of the rotor and the bracket can be selected and respectively used, for example, compared to an integral component made of cast iron, etc. as it integrates the rotor with the bracket; however, it integrates the rotor with the bracket by fastening them via a fastening means, making it problematic in that the disc becomes heavier by at least the weight of the fastening means, in addition to it having a larger number of components.

The present invention has been created in light of the above-described problems, with the object of providing a brake disc along with a manufacturing method thereof that can respectively select the optimum materials of a rotor and a bracket, while reducing the weight of the brake disc and enabling a reduction in the number of components.

Means of Solving the Problem

The invention provides a manufacturing method of a brake disc attached to the axle of a vehicle for braking the vehicle, comprising the steps of: processing a rotor to acquire a rotor made of an approximately annular plate material with a center hole, the opening edge of said center hole having a plurality of projections projecting inwardly; processing a bracket to acquire a bracket made of a tubular member, in which openings corresponding to said projections are formed; and integrating the bracket with the rotor by inserting said bracket through the center hole of the rotor acquired by said rotor processing step and fitting the projections of said rotor into the openings of said bracket.

In an embodiment, the invention also comprises the step of diameter-reduction processing to acquire a diameter-reduced portion by inwardly deforming at least the region in which said openings are formed in the bracket acquired by said bracket processing step, wherein said integrating step integrates the bracket with the rotor by enlarging the diameter of the bracket via outwardly deforming said diameter-reduced portion of the bracket with the bracket after the diameter-reduction processing step inserted through the center hole of the rotor acquired by said rotor processing step, and fitting the projections of said rotor into the openings of said bracket.

In an embodiment of the invention, said integrating step integrates the bracket with the rotor by enlarging the diameter of the bracket via outwardly deforming at least the region in which said openings are formed in a side wall of the bracket with the bracket acquired by said bracket-processing step inserted through the center hole of the rotor acquired by said rotor processing step, and fitting the projections of said rotor into the openings of said bracket.

In an embodiment of the invention, said integrating step carries out a swaging step of integrating said bracket with the rotor by swaging said projections into said openings.

In an embodiment of the invention, said rotor is made of a stainless material and said bracket is made of an aluminum material.

In an embodiment, the invention provides a brake disc attached to the axle of a vehicle for braking the vehicle, wherein, following the steps of: processing a rotor to acquire a rotor made of the approximately annular plate material with a center hole, the opening edge of said center hole having a plurality of projections projecting inwardly; processing a bracket to acquire a bracket made of a tubular member, in which openings corresponding to said projections are formed; and integrating the bracket with the rotor by inserting said bracket through the center hole of the rotor acquired by said rotor processing step and fitting the projections of said rotor into the openings of said bracket, said brake disc is formed by integrating the bracket with the rotor by fitting the projections of said rotor into the openings of said bracket.

In an embodiment, the invention comprises the step of diameter-reduction processing to acquire a diameter-reduced portion by inwardly deforming at least the region in which said openings are formed in the bracket acquired by said bracket processing step, wherein said integrating step integrates the bracket with the rotor by enlarging the diameter of the bracket via outwardly deforming said diameter-reduced portion of the bracket with the bracket after the diameter-reduction processing step inserted through the center hole of the rotor acquired by said rotor processing step, and fitting the projections of said rotor into the openings of said bracket.

In an embodiment of the invention, said integrating step integrates the bracket with the rotor by enlarging the diameter of the bracket via outwardly deforming at least the region in which said openings are formed in a side wall of the bracket with the bracket acquired by said bracket-processing step inserted through the center hole of the rotor acquired by said rotor processing step, and fitting the projections of said rotor into the openings of said bracket.

In an embodiment of the invention, said integrating step carries out a swaging step of integrating said bracket with the rotor by swaging said projections into said openings.

In an embodiment of the invention, said rotor is made of a stainless material and said bracket is made of an aluminum material.

Effects of the Invention

According to the invention, as a brake disc can be acquired by integrating the bracket with the rotor by fitting the projections of said rotor into the openings of said bracket, it is possible to respectively select the optimum materials for the rotor and bracket, while reducing the weight of the brake disc and enabling a reduction in the number of components.

According to an embodiment of the invention, as the bracket is integrated with the rotor by enlarging the diameter of the bracket via outwardly deforming said diameter-reduced portion of the bracket with the bracket after the diameter-reduction processing step inserted through the center hole of the rotor acquired by said rotor processing step, and fitting the projections of said rotor into the openings of said bracket, it is possible to make the openings in the holes formed on a side wall of the bracket. Accordingly, by fitting the projections of the rotor into the holes as the openings, it is possible to prevent the rotor from falling off the bracket while fastening them in the rotational direction, in addition to enabling more firm integration of the rotor with the bracket.

According to an embodiment of the invention, as the integrating step integrates the bracket with the rotor by enlarging the diameter of the bracket via outwardly deforming at least the region in which the openings are formed in a side wall of the bracket with the bracket acquired by the bracket-processing step inserted through the center hole of the rotor acquired by the rotor processing step, and by fitting the projections of the rotor into the openings of the bracket, the fastening means, etc. is rendered unnecessary, enabling a reduction in the weight of the brake disc, along with a reduction in the number of components such that the manufacturing step can be more simplified compared to a brake disc requiring steps for reducing and enlarging the diameter of the bracket.

According to an embodiment of the invention, as the integrating step carries out a swaging step of integrating the bracket with the rotor by swaging the projections into the openings, it is possible to more firmly integrate the rotor with the bracket.

According to an embodiment of the invention, as the rotor is made of a stainless material and said bracket is made of an aluminum material, it is possible to increase the strength and heat resistance of the rotor in the brake disc, while enabling improvement in weight saving and heat dissipation of the bracket.

BRIEF DESCRIPTION OF THE DRAWINGS

FIG. 1 is a plan view and front view illustrating the brake disc according to Embodiment 1 of the present invention.

FIG. 2 is a sectional view taken along the line of II-II in FIG. 1.

FIG. 3 is a sectional view taken along the line of in FIG. 1.

FIG. 4 is a plan view and front view illustrating a rotor in the brake disc.

FIG. 5 is a plan view and front view illustrating a bracket in the brake disc.

FIG. 6 is a sectional view taken along the line of VI-VI in FIG. 5.

FIG. 7 is a bottom view and sectional view illustrating the bracket in the manufacturing process of the brake disc (the bracket after the diameter-reduction processing step).

FIG. 8 is a plan view and front view illustrating the rotor and the bracket in the manufacturing process of the brake disc (the rotor and the bracket after the integrating step).

FIG. 9 is a sectional view taken along the line of IX-IX in FIG. 8.

FIG. 10 is a pattern diagram illustrating a press working apparatus in the brake disc for acquiring the bracket.

FIG. 11 is a pattern diagram illustrating the press working apparatus for applying a diameter-reduction processing step to the bracket in the brake disc.

FIG. 12 is a pattern diagram illustrating the press working apparatus for applying an integrating step in the brake disc.

FIG. 13 is a pattern diagram illustrating the press working apparatus for applying a swaging step in the brake disc.

FIG. 14 is a flowchart indicating the manufacturing step of the brake disc.

FIG. 15 is a plan view illustrating the brake disc according to Embodiment 2 of the present invention.

FIG. 16 is a sectional view taken along the line of XVI-XVI in FIG. 15.

FIG. 17 is a plan view and front view illustrating the rotor in the brake disc.

FIG. 18 is a plan view and front view illustrating the bracket in the brake disc.

FIG. 19 is a plan view illustrating the state in which the bracket is inserted through the center hole of the rotor during the manufacturing process of the brake disc (before the diameter-enlarging step).

FIG. 20 is a sectional view taken along the line of XX-XX in FIG. 19.

FIG. 21 is a plan view and front view illustrating the bracket (a single body) enlarged after the diameter-enlarging step according to the brake disc.

FIG. 22 is a flowchart illustrating the manufacturing process of the brake disc.

FIG. 23 is a longitudinal sectional view illustrating the bracket in the brake disc according to other embodiments of the present invention.

FIG. 24 is a longitudinal sectional view illustrating the state in which the bracket in the brake disc is integrated with the rotor.

MODE FOR CARRYING OUT THE INVENTION

Hereinafter, the embodiments of the present invention will be described in detail with reference to the drawings.

A brake disc according to Embodiment 1 is configured so as to make it integrally rotatable with the axles of vehicles such as cars and motorcycles by attaching the brake disc to the axles of the vehicles such that it acquires the braking force by depressing the brake pad onto the brake disc, while, as illustrated in FIGS. 1 to 3, the brake disc is formed by integrating rotor 1 that can depress the brake pad (not illustrated) with bracket 2 to be attached to the axle (not illustrated) of the vehicle.

As illustrated in FIG. 4, rotor 1 is made of an approximately annular plate material with center hole 1a, the opening edge of center hole 1a having a plurality of projections 1b projecting inwardly, while being made of a stainless material according to the present embodiment. In addition, rotor 1 according to the present embodiment has projections 1b respectively formed in a rectangular shape and step portion 1ba formed along the opening edge of center hole 1a in the thickness direction. Furthermore, other shapes may be available rather than projection 1b in a planar view, while the number of the projections to be formed on rotor 1 can be arbitrarily set.

As illustrated in FIG. 5, bracket 2 is formed by a bottomed tubular member having side wall 2a and bottom portion 2b, and openings 2c corresponding to projections 1b of rotor 1 are formed on side wall 2a of said bracket, while, according to the present embodiment, said bracket is made of an aluminum material (a material containing aluminum as a major component, containing aluminum alloy, etc.). The external diameter measurement of bracket 2 is set to be slightly larger than the internal diameter measurement (the measurement between opposing projections 1b) of center hole 1a of rotor 1, enabling the insertion of bracket 2 into center hole 1a of rotor 1 after a diameter-reduction processing step to be described later.

However, openings 2c according to the present embodiment are formed by through holes (holes penetrating inside and outside of bracket 2) across the entire circumference of side wall 2a, while being formed in approximately the same shape and at approximately the same position as projections 1b with bracket 2 inserted through center hole 1a of rotor 1. Furthermore, bottom portion 2b of bracket 2 has a plurality of concentrically formed attachment holes 2d, enabling the attachment of the brake disc formed by rotor 1 and bracket 2 to the vehicle by fastening a bolt, etc. via inserting it into attachment holes 2d and bolt holes (not illustrated) formed on the axle of the vehicle. In the drawings, mark 2e denotes a through hole formed on bottom portion 2b of bracket 2.

Here, as illustrated in FIGS. 1 to 3, the brake disc according to the present embodiment is formed by integrating bracket 2 with rotor 1 by inserting bracket 2 through center hole 1a of rotor 1 and fitting projections 1b of rotor 1 into openings 2c of bracket 2. In other words, by inserting projections 1b into openings 2c to be fit with bracket 2 inserted through center hole 1a of rotor 1, it is possible to prevent rotor 1 from axially falling off bracket 2 (the vertical direction of FIG. 2) while fastening them in the rotational direction.

In other words, the brake disc according to the present embodiment is formed of two components including rotor 1 and bracket 2 and by integrating rotor 1 with bracket 2 without welding and bonding steps and not using a fastening means such as a rivet, screw, etc. In addition, bracket 2 is preferably integrated with rotor 1 by swaging projections 1b into openings 2c by plastic-deforming projections 1b inserted through openings 2c.

Hereinafter, the manufacturing method of the brake disc according to the present embodiment will be described with reference to the flowchart, etc. depicted in FIG. 14.

As illustrated in FIG. 14, the brake disc according to the present embodiment includes rotor processing step S1, bracket processing step S2, diameter-reduction processing step S3, integrating step S4, and swaging step S5. Rotor processing step S1 is a step for acquiring rotor 1 made of a stainless material as depicted in FIG. 4 (a rotor made of an approximately annular plate material with center hole 1a, the opening edge of center hole 1a having a plurality of projections 1b projecting inwardly). Furthermore, rotor 1 according to the present embodiment comprises step parts 1ba formed along the opening edge of center hole 1a in the thickness direction, for example, by press work.

Bracket processing step S2 that is a step for acquiring bracket 2 made of an aluminum material as depicted in FIGS. 5, 6 (a bracket made of a tubular member having openings 2c corresponding to projections 1b formed thereon), for example, acquires the appearance configuration of bracket 2 using the press working apparatus as depicted in FIG. 10. The press working apparatus used in bracket processing step S2 includes upper mold U1 and lower side D1 and carries out drawing due to the proximity or abutting of this upper mold U1 and lower side D1 to acquire the appearance configuration of bracket 2, after which, openings 2c are formed on specific positions of bracket 2 by punching, etc.

As illustrated in FIG. 7, diameter-reduction processing step S3 that is a step for acquiring diameter-reduced portion 2f by inwardly deforming (plastic-deforming) at least the region in which openings 2c are formed in bracket 2 acquired by bracket processing step S2 (the specific scope including openings 2c of the present embodiment and the region elongated from the opening edge portion of the bracket), for example, acquires diameter-reduced portion 2f using the press working apparatus as depicted in FIG. 11. The press working apparatus used by diameter-reduction processing step S3 includes upper mold U2 provided with region a bulging inwardly and lower side D2, while region a of upper mold U2 can form diameter-reduced portion 2f by inwardly depressing bracket 2 due to the proximity or abutting of this upper mold U2 and lower side D2.

Integrating step S4 is a step for integrating bracket 2 with rotor 1 by inserting bracket 2 after diameter-reduction processing step S3 through center hole 1a of rotor 1 acquired by rotor processing step S1 and fitting projections 1b of rotor 1 into openings 2c of bracket 2. Specifically, integrating step S4 according to the present embodiment is a step for integrating bracket 2 with rotor 1 by enlarging the diameter of the bracket via outwardly deforming diameter-reduced portion 2f of bracket 2 with bracket 2 after diameter-reduction processing step S3 inserted through center hole 1a of rotor 1 acquired by rotor processing step S1, and fitting projections 1b of rotor 1 into openings 2c of bracket 2.

Integrating step S4 of the present embodiment integrates the bracket with the rotor, for example, using the press working apparatus as depicted in FIG. 12. The press working apparatus used by integrating step S4 includes upper mold U3 provided with punch portion P and lower side D3, while punch portion P can fit projections 1b into openings 2c by outwardly depressing diameter-reduced portion 2f due to the proximity or abutting of this upper mold U2 and lower side D2, and inserting projections 1b into openings 2c. In other words, according to the present embodiment, as diameter-reduced portion 2f is formed in advance in diameter-reduction processing step S3, during the insertion of bracket 2 through center hole 1a of rotor 1, it is possible to prevent projections 1b from interfering with side wall 2a of bracket 2, while enabling projections 1b to fit into openings 2c by enlarging diameter-reduced portion 2f again after inserting bracket 2.

In addition, according to the present embodiment, in integrating step S4, swaging step S5 for integrating bracket 2 with rotor 1 by swaging projections 1b into openings 2c is carried out. As illustrated in FIG. 13, the press working apparatus used in swaging step S5 includes upper mold U4 and lower side D4, while swaging is carried out by plastic-deforming the region protruding from the outline of rotor 1 by depressing them due to the proximity or abutting of this upper mold U4 and lower side D4, and slightly plastic-deforming projections 1b inserted through openings 2c by vertically depressing the projections.

Thus, as the region protruding from the outline of rotor 1 is compressed by upper mold U4 as illustrated in FIGS. 1 to 3, the brake disc having rotor 1 integrated with bracket 2 after swaging step S5 as illustrated in FIGS. 8, 9 is configured such that the surface of rotor 1 and the opening edge portion of bracket 2 are located on approximately the same plane. Furthermore, a material of the region compressed by upper mold U4 flows into step portion 1ba formed on the opening edge of rotor 1.

As described above, it is possible to acquire a brake disc having rotor 1 integrated with bracket 2. According to the present embodiment, as the brake disc can be acquired by integrating bracket 2 with rotor 1 by fitting projections 1b of rotor 1 into openings 2c of bracket 2 and due to the fastening means, etc. being rendered unnecessary, it is possible to respectively select the optimum materials of rotor 1 and bracket 2, while reducing the weight of the brake disc and enabling a reduction in the number of components.

Specifically, according to the present embodiment, as bracket 2 is integrated with rotor 1 by enlarging the diameter of the bracket via outwardly deforming diameter-reduced portion 2f of bracket 2 with bracket 2 after diameter-reduction processing step S3 inserted through center hole 1a of rotor 1 acquired by rotor processing step S1, and fitting projections 1b of rotor 1 into openings 2c of bracket 2, it is possible to make openings 2c in the holes (through holes) formed on side wall 2a of bracket 2. Accordingly, by fitting projections 1b of rotor 1 into the holes as openings 2c, it is possible to prevent rotor 1 from falling off bracket 2 while fastening them in the rotational direction, in addition to enabling more firm integration of rotor 1 with bracket 2.

Furthermore, in integrating step S4, as swaging step S5 for integrating bracket 2 with rotor 1 by swaging projections 1b to openings 2c is carried out, it is possible to integrate rotor 1 with bracket 2 more firmly and reliably. In the present embodiment, swaging step S5 is carried out; however, if rotor 1 is integrated with bracket 2 firmly and reliably, another step such as swaging step S5 can be omitted. In addition, without limiting the swaging step to the above-mentioned embodiment, projections 1b may be swaged into openings 2c, for example, by plastic-deforming the tip of projections 1b inserted through openings 2c.

Furthermore, as rotor 1 according to the present embodiment is made of a stainless material and bracket 2 is made of an aluminum material, it is possible to increase the strength and heat resistance of rotor 1, while enabling improvement in the weight saving and heat dissipation of bracket 2. If the functions of rotor 1 and bracket 2 can be respectively optimized, other materials can be selected or these members can be made of the same materials.

Hereinafter, the brake disc according to Embodiment 2 of the present invention will be described.

The brake disc according to the present embodiment, along with Embodiment 1, is configured so as to make it integrally rotatable with the axles of vehicles such as cars and motorcycles by attaching the brake disc to the axles of the vehicles such that it acquires braking force by depressing the brake pad onto the brake disc, while, as illustrated in FIGS. 15, 16, the brake disc is formed by integrating rotor 1 that can depress the brake pad (not illustrated) with bracket 2 to be attached to the axle (not illustrated) of the vehicle.

As illustrated in FIG. 17, rotor 1 is made of an approximately annular plate material with center hole 1a, the opening edge of center hole 1a having a plurality of projections 1b projecting inwardly, and is made of a stainless material according to the present embodiment. Furthermore, rotor 1 according to the present embodiment also includes step portion 1ba along with Embodiment 1. As illustrated in FIG. 18, bracket 2 is formed by a bottomed tubular member having side wall 2a and bottom portion 2b, and openings 2c corresponding to projections 1b of rotor 1 are formed on side wall 2a of said bracket, while, according to the present embodiment, said bracket is made of an aluminum material (a material containing aluminum as a major component, containing aluminum alloy, etc.). Specifically, external diameter measurement Lb of bracket 2 according to the present embodiment is set to be slightly smaller than internal diameter measurement La of center hole 1a of rotor 1 (the measurement between opposing projections 1b), enabling the insertion of bracket 2 into center hole 1a of rotor 1 without the diameter-reduction processing step according to Embodiment 1.

However, openings 2c according to the present embodiment, along with Embodiment 1, are formed by through holes (holes penetrating inside and outside of bracket 2) across the entire circumference of side wall 2a, while being formed in approximately the same shape and at approximately the same position as projections 1b with bracket 2 inserted in center hole 1a of rotor 1 (however, in the present embodiment, tubular bracket 2 without the diameter-reduction processing step is inserted through the center hole).

Here, as illustrated in FIGS. 15, 16, the brake disc according to the present embodiment is formed by integrating bracket 2 with rotor 1 by inserting bracket 2 through center hole 1a of rotor 1 and fitting projections 1b of rotor 1 into openings 2c of bracket 2 while keeping diameter-enlarged portion 2aa (refer to FIGS. 16, 21) on side wall 2a of bracket 2 (the region in which openings 2c are formed). In other words, by inserting projections 1b into openings 2c to be fit there with bracket 2 inserted through center hole 1a of rotor 1, it is possible to prevent rotor 1 from axially (in the vertical direction of FIG. 16) falling off bracket 2 while fastening them in the rotational direction.

In other words, the brake disc according to the present embodiment, along with Embodiment 1, is formed of two components including rotor 1 and bracket 2 and by integrating rotor 1 with bracket 2 without welding and bonding steps and without using a fastening means such as a rivet, a screw, etc. In addition, bracket 2 is preferably integrated with rotor 1 by swaging projections 1b into openings 2c by plastic-deforming projections 1b inserted through openings 2c.

Hereinafter, the manufacturing method of the brake disc according to the present embodiment will be described with reference to the flowchart, etc. depicted in FIG. 22.

As illustrated in FIG. 22, the brake disc according to the present embodiment includes rotor processing step S1, bracket processing step S2, integrating step S3, diameter-enlargement processing step S4, and swaging step S5. Furthermore, detailed descriptions of rotor processing step S1, bracket processing step S2, and swaging step S5, or the used press working apparatus, etc. are omitted since they are identical with those of Embodiment 1.

Integrating step S3 is a step for integrating bracket 2 with rotor 1 by inserting bracket 2 acquired by bracket processing step S2 through center hole 1a of rotor 1 acquired by rotor processing step S1 and fitting projections 1b of rotor 1 into openings 2c of bracket 2. Specifically, integrating step S3 according to the present embodiment, which includes diameter-enlargement processing step S4 for enlarging the diameter of the bracket by outwardly deforming at least the region in which openings 2c are formed in side wall 2a of bracket 2, is a step for integrating bracket 2 with rotor 1 by fitting openings 2c into projections 1b of rotor 1.

Specifically, as illustrated in FIGS. 19, 20, diameter-enlargement processing step S4 is a step for integrating bracket 2 with rotor 1 by enlarging the diameter of the bracket (bulging the side wall on the opening side) via outwardly deforming the region in which openings 2c of bracket 2 are formed (the entire side wall on the opening side of bracket 2) with bracket 2 (tubular bracket 2) acquired by bracket processing step S2 inserted through center hole 1a of rotor 1 acquired by rotor processing step S1 so as to form diameter-enlarged portion 2aa (refer to FIG. 21), and fitting projections 1b of rotor 1 into openings 2c of bracket 2.

As described above, it is possible to acquire a brake disc having rotor 1 integrated with bracket 2. According to the present embodiment, along with Embodiment 1, as the brake disc can be acquired by integrating bracket 2 with rotor 1 by fitting projections 1b of rotor 1 to openings 2c of bracket 2 and due to the fastening means, etc. being rendered unnecessary, it is possible to respectively select the optimum materials of rotor 1 and bracket 2, while reducing the weight of the brake disc and enabling a reduction in the number of components.

Specifically, as the integrating step according to the present embodiment integrates bracket 2 with rotor 1 by enlarging the diameter of the bracket via outwardly deforming at least the region in which openings 2c are formed in the side wall of bracket 2 (in the present embodiment, the side wall on the opening side of bracket 2) with bracket 2 (cylinder shape) acquired by bracket processing step S2 inserted through center hole 1a of rotor 1 acquired by rotor processing step S1, and fitting projections 1b of rotor 1 into openings 2c of bracket 2, the fastening means, etc. are rendered unnecessary, enabling a reduction in the weight of the brake disc, in addition to reducing the number of components such that the manufacturing step can be more simplified compared to the brake disc requiring the steps for reducing and enlarging the diameter of the bracket along with Embodiment 1.

The present embodiment is described as above; however, without limiting the present invention to this, for example, as illustrated in FIG. 23, notches cut from the opening edge on the side wall of bracket 3 comprising the side wall and the bottom portion may be used as openings 3a. In other words, in contrast to the fact that openings 2c in the abovementioned embodiments (Embodiment 1 and Embodiment 2) are holes formed on the side wall, as illustrated in FIG. 24, in place of these holes, notches cut from the opening edge on the side wall of the bracket may be defined as openings 3a, while fitting projections 1b of rotor 1 into openings 3a. When this is applied to Embodiment 1, as projections 1b move along openings 3a upon inserting bracket 3 into center hole 1a of rotor 1, the step, etc. for enlarging diameter-reduction processing step S3 and diameter-reduced portion 2f again can be rendered unnecessary.

In addition, rotor processing step S1, bracket processing step S2, diameter-reduction processing step S3, integrating step S4, and swaging step S5 according to Embodiment 1, or rotor processing step S1, bracket processing step S2, integrating step S3, diameter-enlargement processing step S4, and swaging step S5 according to Embodiment 2 are not limited to the steps using the press working apparatus as illustrated in FIGS. 10 to 13 but may be carried out using any press working apparatus, tools, or the like. Furthermore, the shapes and measurement of the projections of rotor 1 and the shapes and measurement of the openings of bracket 2 may be arbitrarily defined if they can be fit into said openings and projections.

INDUSTRIAL APPLICABILITY OF THE INVENTION

Other configurations of a brake disk and the manufacturing method thereof may be possible if the manufacturing method of the brake disc comprises the steps of: processing a rotor to acquire a rotor made of an approximately annular plate material with a center hole, the opening edge of said center hole having a plurality of projections projecting inwardly; processing a bracket to acquire a bracket made of a tubular member, in which openings corresponding to said projections are formed; and integrating the bracket with the rotor by inserting said bracket through the center hole of the rotor acquired by said rotor processing step and fitting the projections of said rotor into the openings of said bracket; along with a disk acquired by said method.

EXPLANATION OF SYMBOLS 1 rotor
1b projections
2 bracket
2c openings
2f diameter-reduced portion
2aa diameter-enlarged portion

What is claimed is:
1. A brake disc manufacturing method, said brake disc being attachable to the axle of a vehicle for braking the vehicle, said method comprising the steps of:
processing a rotor comprising a substantially annular plate with a center hole, the edge of said center hole having a plurality of projections projecting inwardly into said center hole;
processing a bracket comprising a tubular member, in which openings corresponding to said projections are provided; and
integrating or coupling the bracket with the rotor by inserting said bracket through the center hole of said rotor and fitting the projections of said rotor into the openings of said bracket,
wherein
the manufacturing method comprises alternatively one the following groups of steps:
group A
the step of diameter-reduction processing to obtain a diameter-reduced portion of the bracket by inwardly deforming at least the region in which said openings are formed in said the bracket; and inserting the diameter-reduction portion through the center hole of said rotor, and coupling the bracket with the rotor by enlarging the diameter of the bracket via outwardly deforming said diameter-reduced portion of the bracket, and fitting the projections of said rotor into the openings of said bracket; or:
group B
enlarging the diameter of the bracket via outwardly deforming at least the region in which said openings are formed in a side wall of the bracket with the bracket acquired by said bracket-processing step inserted through the center hole of the rotor acquired by said rotor processing step, and fitting the projections of said rotor into the openings of said bracket.
2. The manufacturing method of the brake disc according to claim 1, wherein said integrating step carries out a swaging step of integrating said bracket with the rotor by swaging said projections to said openings.
3. The manufacturing method of the brake disc according to claim 1, wherein said rotor is made of a stainless material and said bracket is made of an aluminum material.
4. A brake disc manufactured according to claim 1.

* * * * *